(12) United States Patent
Vanacore et al.

(10) Patent No.: US 12,232,458 B2
(45) Date of Patent: Feb. 25, 2025

(54) FARMING SYSTEM

(71) Applicant: Evergreens, LLC, Hudson, MA (US)

(72) Inventors: Mark Vanacore, Arlington, MA (US); Ahmad Zameli, Cambridge, MA (US); Jonathan Toll, Medford, MA (US)

(73) Assignee: Evergreens, LLC, Hudson, MA (US)

( * ) Notice: Subject to any disclaimer, the term of this patent is extended or adjusted under 35 U.S.C. 154(b) by 181 days.

(21) Appl. No.: 17/492,098

(22) Filed: Oct. 1, 2021

(65) Prior Publication Data

US 2022/0117179 A1 Apr. 21, 2022

Related U.S. Application Data

(60) Provisional application No. 63/094,283, filed on Oct. 20, 2020.

(51) Int. Cl.
*A01G 31/04* (2006.01)
*B65B 25/02* (2006.01)

(52) U.S. Cl.
CPC .................................. *A01G 31/042* (2013.01)

(58) Field of Classification Search
CPC ...... A01G 31/042; A01G 31/04; A01G 31/02; A01G 9/247; A01G 9/24
See application file for complete search history.

(56) References Cited

U.S. PATENT DOCUMENTS

| | | | | |
|---|---|---|---|---|
| 3,432,965 | A * | 3/1969 | Smith | A01G 31/045 47/60 |
| 3,986,638 | A * | 10/1976 | DeHart | A01G 9/085 221/211 |
| 4,068,405 | A * | 1/1978 | Campbell | A01G 31/042 47/65 |
| 4,384,537 | A * | 5/1983 | duBrucq | A01C 7/002 111/73 |
| 2019/0208711 | A1* | 7/2019 | Sahu | A01G 9/249 |
| 2020/0236868 | A1* | 7/2020 | Smith | A01C 1/02 |
| 2020/0239050 | A1* | 7/2020 | Millar | B61L 25/025 |
| 2021/0059140 | A1* | 3/2021 | McHenry, III | A01G 31/04 |
| 2021/0251163 | A1* | 8/2021 | Pape | A01G 2/10 |
| 2022/0234078 | A1* | 7/2022 | Bartrom | B07C 5/342 |

FOREIGN PATENT DOCUMENTS

| | | | | |
|---|---|---|---|---|
| GB | 2535163 A | * | 8/2016 | F04D 19/042 |
| WO | WO-2005092077 A2 | * | 10/2005 | A01D 47/00 |
| WO | WO-2014057233 A2 | * | 4/2014 | A01G 9/104 |
| WO | WO-2021260536 A1 | * | 12/2021 | A01G 31/02 |

* cited by examiner

*Primary Examiner* — Magdalena Topolski
*Assistant Examiner* — Spencer T Callaway
(74) *Attorney, Agent, or Firm* — Wolf, Greenfield & Sacks, P.C.

(57) ABSTRACT

Embodiments disclosed herein include a farm arranged to grow crops. In some embodiments, the farm includes a seeding station, an irrigation and growing station, and a harvesting and packaging station. In some embodiments, the farm is arranged to grow crops via to a hybrid aeroponic and hydroponic irrigation system. In some embodiments, the crops are grown in a container having a hydroponic irrigation zone and an aeroponic irrigation zone.

9 Claims, 11 Drawing Sheets

FARMING SYSTEM

CROSS-REFERENCE TO RELATED APPLICATIONS

This application claims the benefit under 35 U.S.C. § 119(e) of U.S. Provisional Application Ser. No. 63/094,283, titled "FARMING SYSTEM," filed on Oct. 20, 2020, which is incorporated herein by reference in its entirety.

FIELD

The disclosed embodiments relate to farming systems, such as automated farming systems.

BACKGROUND

Crops may be grown by planting seeds in soil, allowing the crops to grow, and harvesting the crops from the ground and/or from one or more bushes or trees. Crops also may be grown without the use of soil. For example, crops may be grown via aeroponics or hydroponics.

SUMMARY

According to one embodiment, a farm for growing one or more crops includes a seeding station arranged to load seeds onto or at least partially into a growing surface of a container, an irrigation and growing station arranged to supply water and/or nutrients to the container for hydroponic aeroponic irrigation of the one or more crops, and a harvesting and packaging station arranged to harvest the crops from the container and place the crops in one or more packages.

According to another embodiment, a method of growing crops is disclosed. The method includes loading one or more seeds onto or at least partially into a growing surface of a container, irrigating the crops via aeroponic and hydroponic irrigation, and harvesting the crops.

According to still another embodiment, a method includes loading one or more seeds onto or at least partially into a growing surface of a container arranged to grow crops. The one or more seeds are suspended in a viscous fluid arranged to hold the one or more seeds in a desired position on or at least partially in the growing surface.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
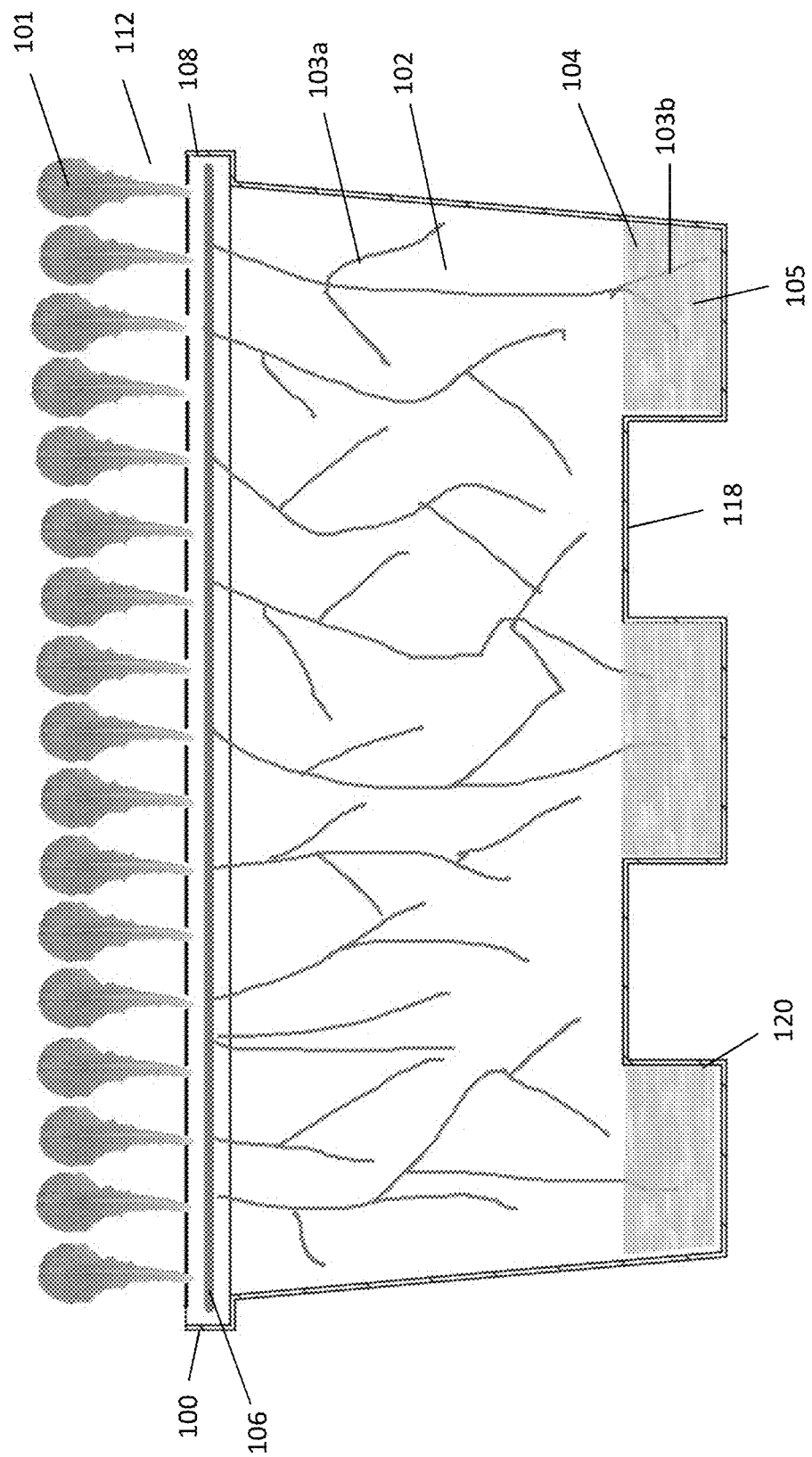
FIG. 1 shows a container used to grow crops according to some embodiments of the present disclosure.

As is known, crops are traditionally grown by planting seeds in soil, allowing the crops to grow, and harvesting the crops from the ground and/or from one or more bushes or trees. Crops have also been grown without the use of soil. For example, crops may be grown via aeroponics, where crops are grown in air and misted with water. Crops also may be grown via hydroponics, with the roots being exposed to a nutritious liquid. For example, the roots may be at least partially submerged in an aqueous solution with nutrients.

The inventors have recognized that advantages may be realized by growing crops via a hybrid farming system using both hydroponic and aeroponic irrigation. For example, in some embodiments, as will be described, the farming system may be arranged such that a first portion of the roots of the crops may be irrigated via aeroponic irrigation while a second portion of the roots may be irrigated via hydroponic irrigation.

In some embodiments, the first portion of the roots may include an upper root zone. In such embodiments, the upper root zone, also referred to as an aeroponic root zone, may be suspended in air and sprayed with water and/or nutrients. For example, the aeroponic root zone may be misted with water and/or nutrients. In some embodiments, the second portion of the roots may include a lower root zone. In such embodiments, the lower root zone, also referred to as the hydroponic root zone, may be at least partially placed in water and nutrients. For example, the hydroponic root zone may be at least partially disposed in a pool of water. In some embodiments, a distal end of the roots may be at least partially submerged in water and nutrients while another portion of the roots are misted with water and nutrients.

In some embodiments, the disclosed system may provide an improved growing environment for crops. For example, as compared to systems that use only one type of irrigation (e.g., aeroponic irrigation or only hydroponic irrigation), the disclosed system may irrigate the crops via two water and/or nutrient sources. As such, if the water and/or nutrient sources were to unexpectedly stop working, the crops could still be irrigated during the growing process and thereafter harvested. As will be appreciated, in other known systems, failure of a water and/or nutrient source may require discarding of the crops. Providing additional irrigation may also expedite growth in some embodiments.

The inventors have also recognized the benefits of growing crops in a container arranged to provide hydroponic and aeroponic irrigation to the crops, such as to the roots (e.g., the hydroponic and aeroponic root zones) of the crops. In some embodiments, the container may include an aeroponic irrigation zone arranged to allow the roots to be misted and a hydroponic irrigation zone to allow the roots to be placed in an aqueous solution with nutrients.

The inventors have further recognized the benefits of providing a container that allows the crops to be divided into multiple growing areas that may be modular and mobile. For example, instead of having a single, larger container in which all the crops are grown, the farming system may utilize several, smaller containers for growing crops. In such embodiments, the containers may be separated from one another, allowing multiple crops to be grown within the same area. Such modularity may allow for easy to clean crops and root zones. For example, if necessary, an operator may remove a single container for harvesting and/or cleaning of the container. In another example, should part of the crops be diseased or not be growing properly, one or more affected containers may be removed from the farming system without disrupting the growth of the other crops in the other containers in the system.

The inventors have also recognized the benefits of automating at least a part of the farming process. For example, in some embodiments, one or more containers may be placed into a farming system and moved along different stations that correspond to different stages of the farming process. For example, the containers may be moved to a seeding station, a growing station, and thereafter to a harvesting and packaging station. In some embodiments, such automation may provide consistency in the crops being grown in the farm. It also may be more efficient with respect to the resources (e.g., water and/or nutrients) needed for growing and harvesting plants.

The inventors have also recognized the benefits of tracking the progress of the crops during farming. For example, in some embodiments, the farm may be arranged to track the progress of each crop (e.g., in the corresponding container) from seeding to harvesting and to label the packaged crops according to the corresponding container used for growing. In such an example, should crops need to be recalled (e.g., for contamination or disease), the crops may be identified via the label(s) corresponding to the affected growing container(s), and only the identified crops would need to be removed, such as from the supermarket. As will be appreciated, in traditional farming where all the crops from a farm may be combined prior to packaging, or crops from different farms may be combined prior to packaging, more crops may need to be disposed of because the exact crops needing to be recalled may not be identifiable from the remainder of the combined crops.

In view of the above, embodiments disclosed herein include a farming system including one or more farms arranged to grow crops. For example, the farming system may include an automated farming system that can grow crops without the use of soil. As will be appreciated, although the farming system is shown and described for growing crops without the use of soil, such farming systems also may be arranged to grow plants in soil.

In some embodiments, the farming system may be arranged to automate various stages of the farming process, such as seeding, growing, and/or harvesting and packaging. In some embodiments, the crops may be grown in containers which are moveable between the different stations, such as via a conveyor. In some embodiments, the conveyor may include a conveyor belt. The conveyor also may include rollers.

In some embodiments, the containers may be arranged to facilitate irrigation of the crops via a hybrid hydroponic and aeroponic irrigation system. In such embodiments, the containers may include a first aeroponic irrigation zone arranged to allow the roots to be misted with water and/or nutrients and a second hydroponic irrigation zone arranged to allow the roots to be at least partially placed in an aqueous solution with nutrients. In some embodiments, the container includes one or more openings for water and/or nutrients to be sprayed into when the containers are in the farm. For example, one or more nozzles may be placed near and/or adjacent to the containers in the irrigation and growing station for misting the aeroponic root zone. In such an example, the mist generated from the spray may penetrate the container via the one or more openings. In another example, the nozzles may be placed at or at least partially in one of the openings to direct the mist into the container. In some embodiments, the container also may include one or more channels or troughs to hold water and/or nutrients for the hydroponic root irrigation. In such embodiments, at least a portion of the roots may be disposed in the water and/or nutrients in the channel(s).

In some embodiments, the container includes a growing surface arranged to separate the growing area from the root zone. In some embodiments, one or more seeds are loaded onto and/or at least partially into the growing surface in the seeding station. For example, in some embodiments, the seeds may be disposed on the growing surface, while in other embodiments, seeds may be inserted into the growing surface.

In some embodiments, the growing surface may include a material secured to an upper surface of the container, such as to the lip of the container. In some embodiments, the material may be formed of an organic fabric material. For example, in some embodiments, the fabric material may include bamboo fiber, felt, burlap, biostrate, Rockwoll, coco coir, and/or combinations thereof.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 illustrates an illustrative container 100 used to grow crops 101 in the farming system according to aspects of the present disclosure. As shown in this view, the container may include an aeroponic irrigation zone 102 in which a first portion 103a of the roots of the crops, the aeroponic root zone, may be irrigated via aeroponic irrigation. For example, the first portion of the roots may be sprayed (e.g., misted) with nutrients and/or water via openings in the container. The container also may include a hydroponic irrigation zone 104 in which a second portion 103b of the roots, a hydroponic root zone, may be irrigated via hydroponic irrigation. For example, in some embodiments, the second portion of the roots may be placed in water and/or nutrients 105.

As also shown in FIG. 1, a growing surface 106 is attachable to the container for suspending seeds for growth. As described above, the growing surface may be formed of an organic fabric material, such as bamboo fiber, felt, burlap, biostrate, Rockwoll, coco coir, and/or combinations thereof. In some embodiments, seeds may be applied to a first, outwardly-facing side 110 of the growing surface 106 and/or at least partially in the growing surface. During the growing phase, when the containers are in the growing station of a farm and the crops start to grow, the roots of the crops may penetrate through the growing surface and into the container (see, e.g., FIG. 1). In such embodiments, the crops (e.g., leafy greens) may grow above the growing surface, in a growing area 112.

As shown in FIG. 1, in some embodiments, the growing surface may be attachable at or near an upper surface of the container, such as at an upper rim of the container. In some embodiments, as shown in FIG. 1, the growing surface may be attachable to a ledge 108 that extend around the perimeter of the container.

In some embodiments, the growing surface may be directly attached to the container. For example, the growing surface may be glued or otherwise fixedly adhered to the container (e.g., to the rim of the container). In some embodiments, the growing surface may be attached (e.g., glued) to the entire perimeter of the container. In other embodiments, the growing surface may be attached to only portions of the perimeter of the container. For example, in some embodiments, the container may include one or more clips or fasteners arranged to hold the growing surface to the container, such as at each corner of the container. In some embodiments, the growing surface is arranged to be held taut at the top of the container.

In other embodiments, the growing surface may be indirectly attached to the container, such as via a frame. In such embodiments, the frame may extend upwardly and away from the container, with the aeroponic zone being formed by the frame. The hydroponic zone may be formed by the container in such embodiments. In some embodiments, the growing surface may be attached to the frame via any suitable methods, such as via fasteners.

Figure 2:
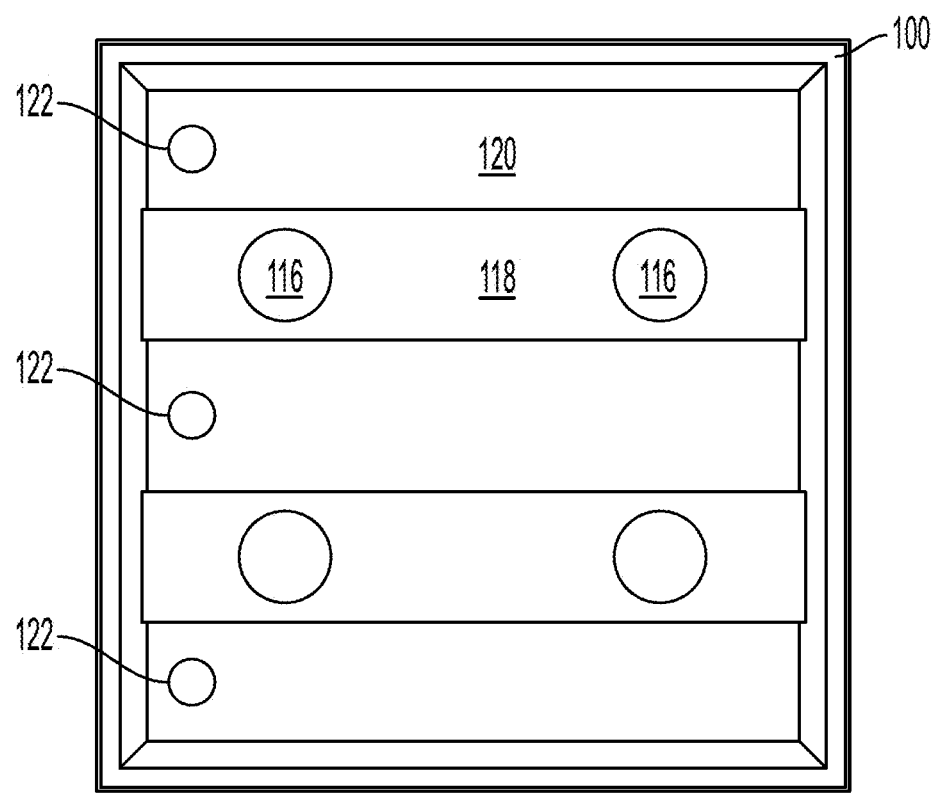
FIG. 2 is a top view of the container of FIG. 1.

As shown in FIG. 2, openings may be formed on the bottom of the container to assist with irrigation of the crops. For example, one or more openings 116 may be arranged to irrigate the aeroponic root zone (e.g., via aeroponic irrigation). For example, in some embodiments, water may be misted onto the roots via the openings 116. In some embodiments, as shown in this view, the openings may be formed in ridges 118 formed in the bottom of the container (see FIG. 1), although the openings also may be formed in other suitable portions of the container (e.g., one or more side walls). As also shown in FIG. 2, hydroponic irrigation zones may be formed in the bottom of the container, such as in grooves or channels 120 formed in between ridges 118 and/or between a ridge and a side wall of the container.

In some embodiments, an opening 122 may be formed in each channel, such as to periodically drain the water and/or nutrients in the channel. As will be appreciated, when not being used for draining, each of the drain openings may include a plug to block the opening and maintain the water and nutrients in the channel. In some embodiments, the opening may be blocked via other suitable members, such a slide or door.

As will be further appreciated, the openings in the ridges and in the channels may be any suitable shape and/or size, although the openings are shown as being circular in cross-sectional shape. For example, the openings may be square, rectangular, oval, triangular, other polygona, or other shape. As will be appreciated, the shape and size of each opening may be the same on each ridge and/or on each channel, although the shape and size may vary between openings.

Figure 3:
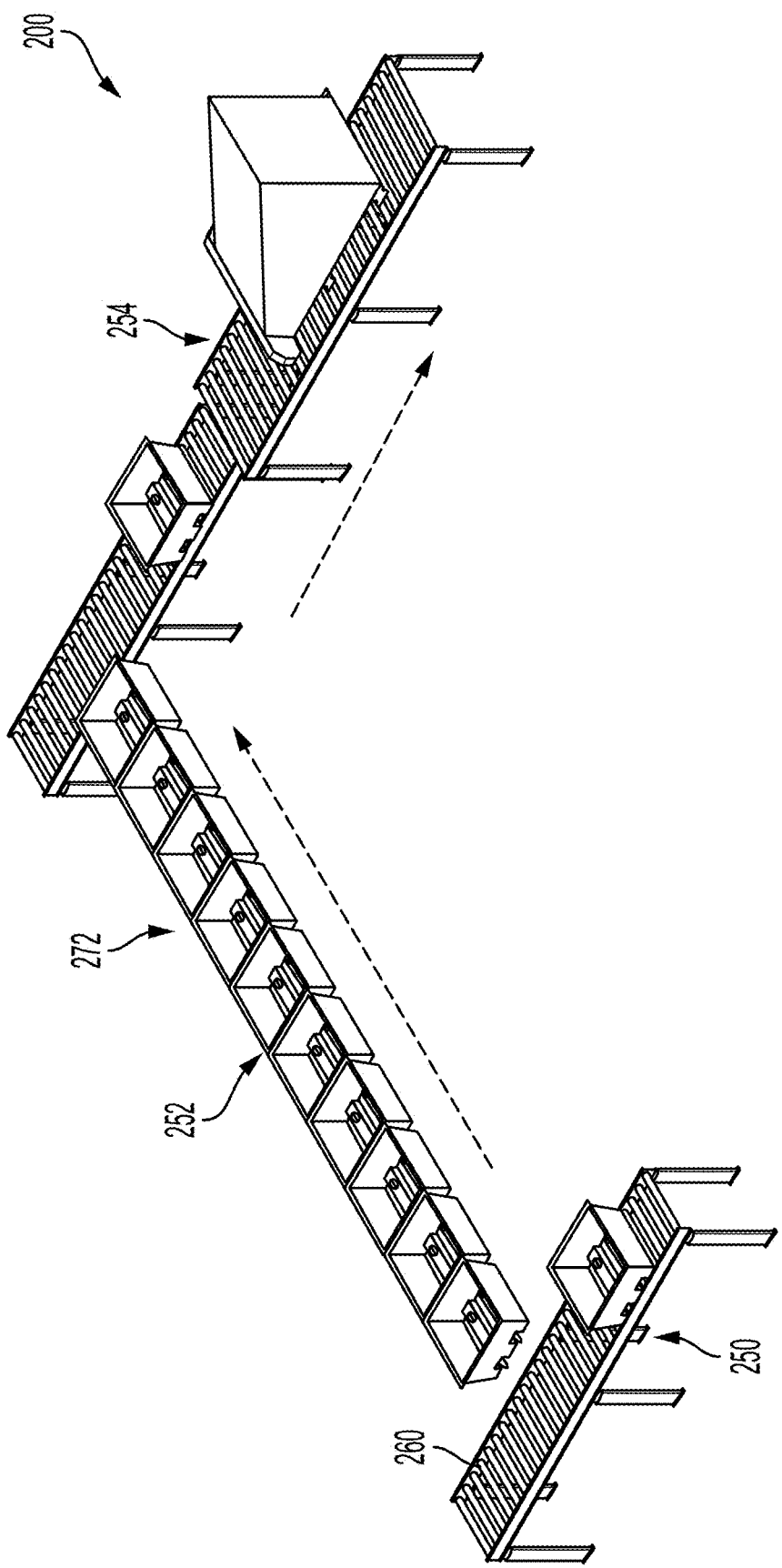
FIG. 3 is a perspective view of a farm according to some embodiments of the present disclosure.

FIG. 3 shows a farming system according to embodiments of the present disclosure. In some embodiment, the farming system includes a farm 200 arranged to process crops from seeding through and to harvesting and packaging. As shown in FIG. 3, the farm may include multiple stations including a seeding station 250, an irrigation and growing station 252, and a harvesting and packing station 254.

In some embodiments, as shown in FIG. 3, the farm may include one or more conveyors 260 arranged to move the container(s) within a station and/or between stations. For example, in some embodiments, as shown in FIG. 3, each station may include a respective conveyor for moving the containers within the station. In some embodiments, the conveyors may be connected to one another. In other embodiments, the conveyors may be positioned near and/or adjacent another station.

As will be appreciated, the containers may be moved automatically between the stations in some embodiments, although the containers also may be manually moved between the stations, or between at least some of the stations. Operation at each station (e.g., seeding or application of water and/or nutrients) may be done automatically by the station, although one or more stations also may be manually operated. For example, seeding may be performed automatically in some embodiments, although seeding also may be manually performed by an operator.

As shown in FIG. 3, in some embodiments, the conveyors may be arranged in straight lines), although the conveyor may be arranged in a circle, a horseshoe, an S-shape, or in another suitable shape. In some embodiments, the conveyors are arranged such that containers lay flat in the system. The conveyors also may be arranged such that the conveyors are slanted while travelling through the system. As will be appreciated, the containers used to grow the crops may have a different arrangement than that shown in FIGS. 1 and 2 in embodiments in which the containers are arranged to be slanted in the farming system.

Figure 4:
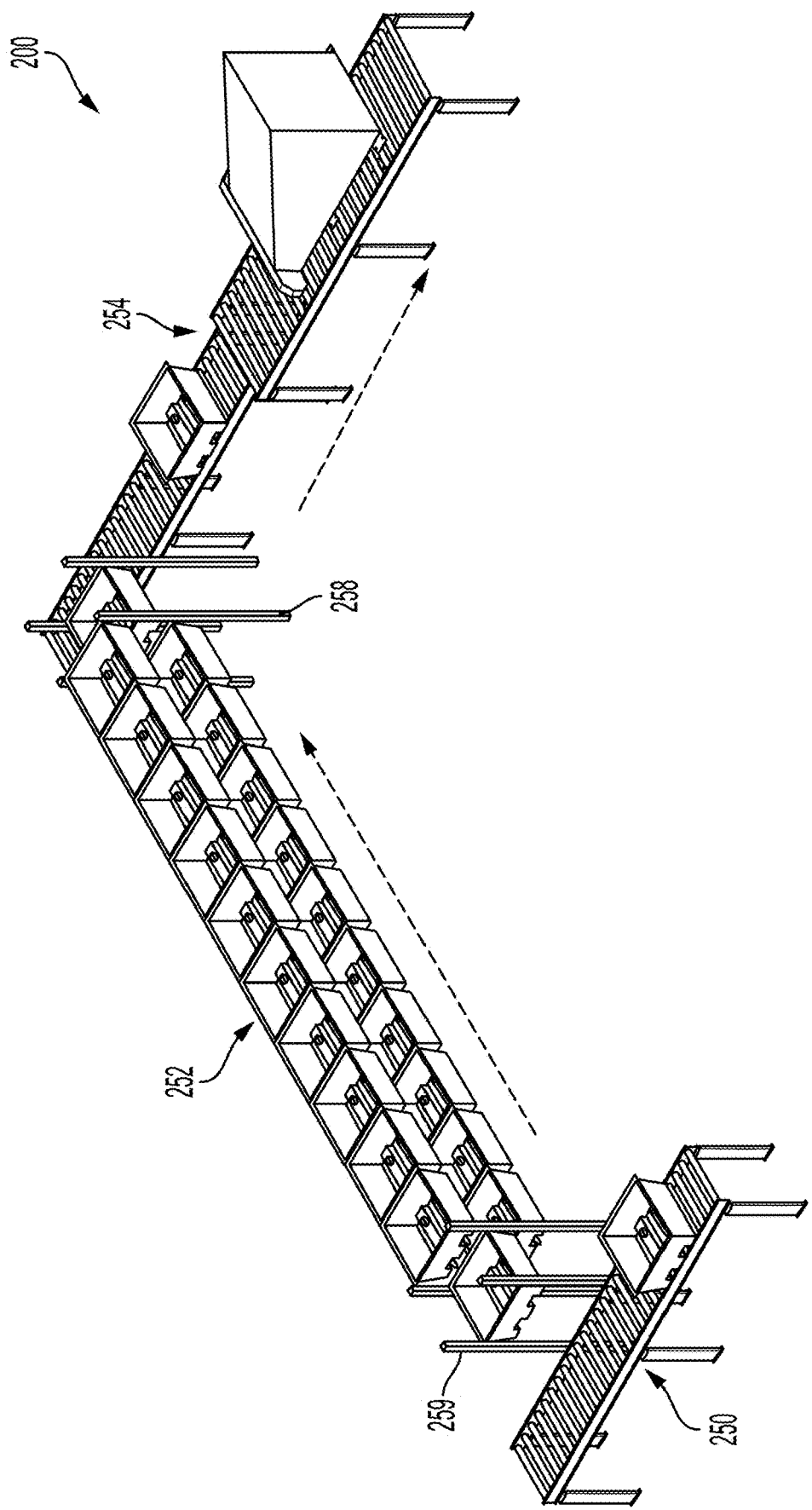
FIG. 4 is a perspective view of a farm according to other embodiments.

In some embodiments, as shown in FIG. 3, the farm may include a single tier of containers moving in and between the different stations (e.g., from the seeding station to the growing station and thereafter to the harvesting station). In other embodiment, one or more stations may be arranged to house more than one tiers of containers. For example, as shown in FIG. 4, the growing station 252 may include multiple tiers to house the containers. In such embodiments, the growing station may include a tower 258 with multiple levels, each level having a respective conveyor for holding and moving the containers through the growing station. In some embodiments, the containers may be manually positioned on and removed from the growing station (e.g., from one or more tiers). In other embodiments, such as that shown in FIG. 3, the tower may include a lift 259 to move the containers between the different tiers and/or between the growing station and one of the adjacent stations.

As will be appreciated, although the growing station is shown with two tiers in FIG. 4, the growing station may include more tiers (e.g. three or more tiers) in other embodiments. In such embodiments, the tower may have more levels and corresponding conveyors. As shown in FIG. 4 each station need not have the same number of tiers in the farm.

As will be further appreciated, although only the growing station is shown with multiple tiers in FIG. 4, other stations (e.g., the seeding station and/or the harvesting station) may have multiple tiers. In such embodiments, the stations may be arranged along the same tower, although the farm may include more than one tower with one or more stations being on a first tower and the other stations on another towers(s). In some embodiments, the towers and corresponding stations may be separated from one another. In such embodiments, a user may move one or more containers between the different towers and stations. Such movement between the different towers also may be automated in some embodiments.

In some embodiments, the farming system may include a single farm, such as that shown in FIGS. 3 and 4. In other embodiments, the farming system may include multiple farms. In such embodiments, each farm may be arranged to grow the same crop, although each farm may be arranged to grow a different crop. In some embodiments, the farming system and multiple farms may be arranged in the same location, such as in the same warehouse.

In some embodiments, each farm may have the same stations, although one or more stations may be shared between the farms in other embodiments. For example, in some embodiments, each farm may have a seeding station, an irrigation and growing station, and a harvesting and packaging station. In another example, the farming system may have a single seeding station that is shared between each farm. In such an example, each farm may include only an irrigation and growing station and a harvesting and packaging station. In other examples, each farm may include a seeding station and a growing and irrigation station, with the harvesting and packaging stations being shared between the farms.

Although embodiments are shown and described with a container being used to grow crops in the farm in some embodiments, in other embodiments, crops may be grown without the use of such containers. For example, in some embodiments, crops may be suspended from the tower for irrigation and growth. As with the other embodiments, the crops may be harvested only once after the prescribed growth time, or daily, as the case may be and as is the case for bushes (e.g., strawberries)

In some embodiments, the farm is arranged to add containers to the farm to start the growth of crops. In some embodiments, containers may be added periodically to the farm to start the growth of the crops. As will be appreciated, the farm may add one container at a time or may add more than one container at the same time to start crop growth. For example, in some embodiments, the farm may add two, three, four, five or more containers at a time. As will be appreciated, in some embodiments, the farm may be arranged to automatically add the container(s), although a user also may add the container(s) to the farm to start the growing process.

In some embodiments, the number of containers added to the farm and the time each container spends in each station is tailored to the type of crops being grown in the farm and the length of the corresponding growth cycle. For example, in an illustrative embodiment, the farm may be arranged to grow a crop with a growth cycle of about 45 days and with the farm being able to accommodate fifteen containers in the irrigation and growing station. In this example, containers may be introduced into the farm in groups of three, with the group of containers being added every few weeks. As will be appreciated, the crops may be added every few hours, days, weeks, or even months, depending upon the type of crops being grown in the farm and the length of the growth cycle.

Figure 5:
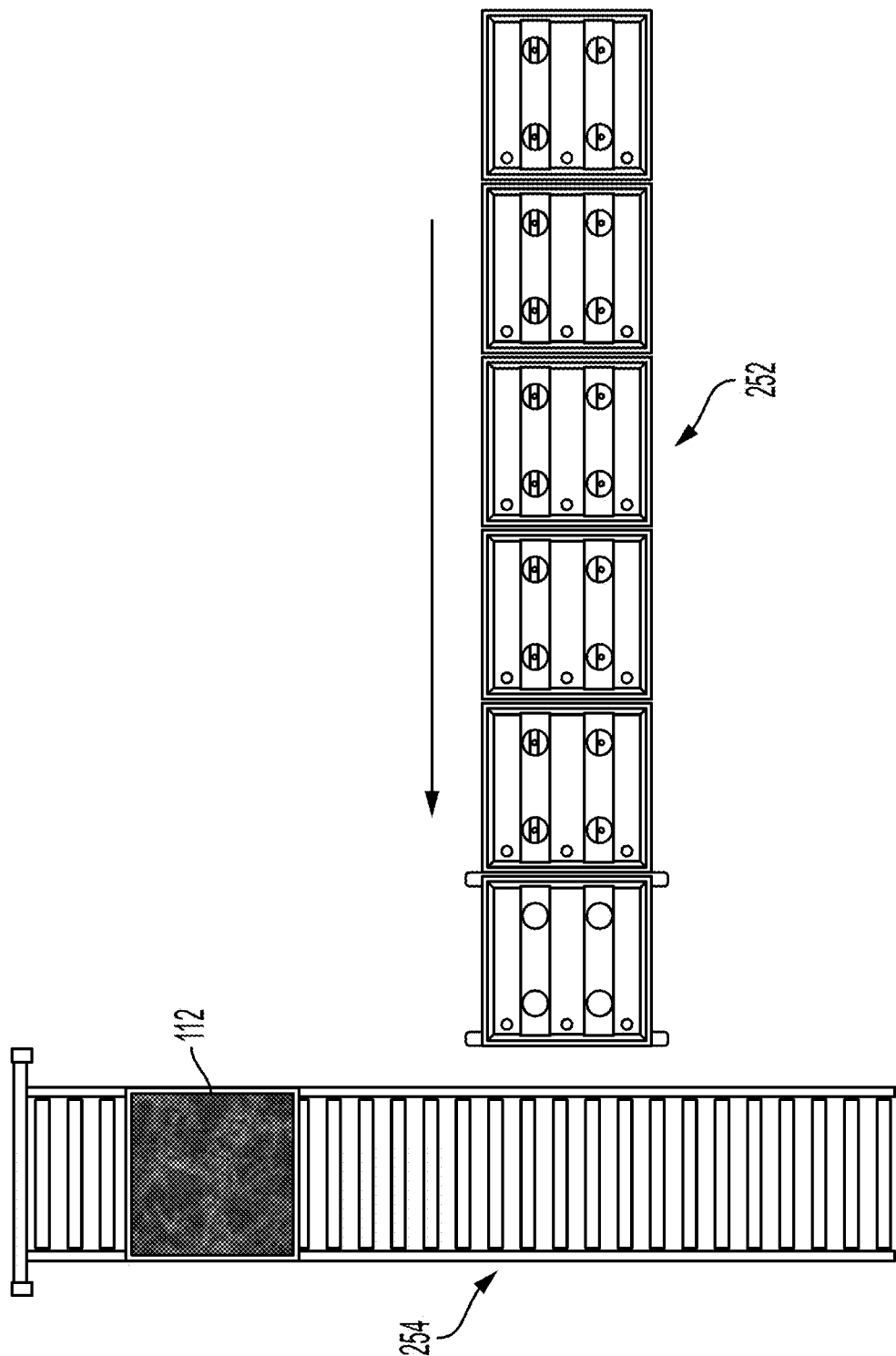
FIG. 5 is a top view of a portion of a farm according to some embodiments.

As will be further appreciated, when new containers are added to the farm, the containers may advance other containers along the same station and/or to another station. For example, the new containers may advance containers along the irrigation and growing station. When the irrigation and growing station is full, adding new containers may move one or more containers from the growing station to the harvesting and packaging station. In such examples, the farm is arranged such that the container(s) moved into the harvest station include crops that are fully grown (see, FIG. 5, showing a container with a representative fully grown crop 112 being moving to the harvest station).

Although embodiments are described for using the farm to process crops from seeds to harvesting, in other embodiments, the farm may be used for only germination of the seeds and production of seedlings. In such embodiments, containers may spend less time in the irrigation and growing station. Also in these embodiments, the containers moving into the harvesting section may include only seedlings instead of crops that are fully grown.

In some embodiments, the time of growth may range from between about 6 days to 60 days for leafy greens, depending upon the crop, with harvesting taking places after the period of growth. For example, in some embodiments, the length of growth may between about 20 days and 50 days in some embodiments. For other crops, like strawberries, the length of grown may last up to about a year, although harvesting from the bush may occur more frequently, such as every day.

Figure 6:
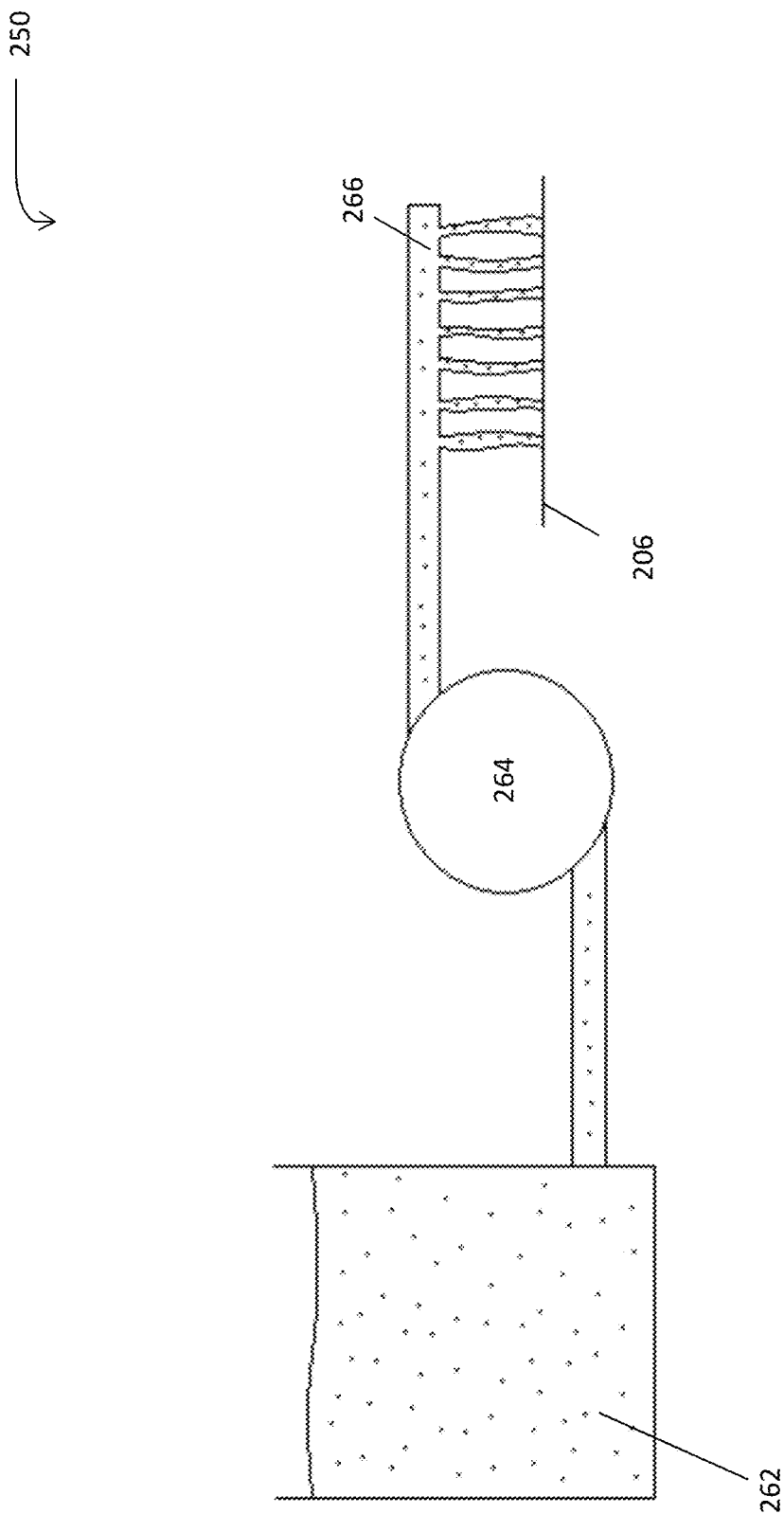
FIG. 6 illustrates a portion of a seeding station of a farm according to some embodiments.
Figure 7:
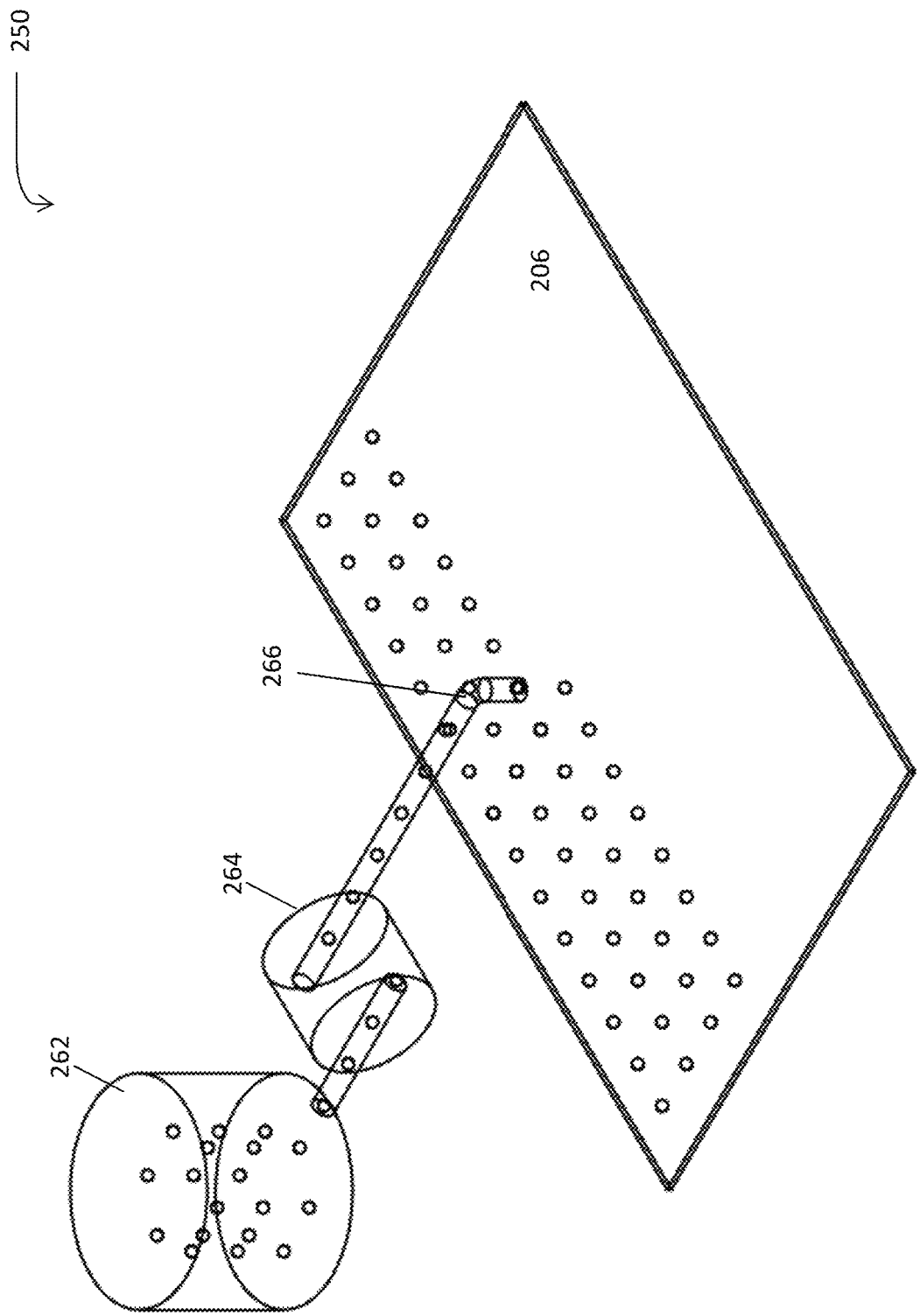
FIG. 7 illustrates a perspective view of the seeding station of FIG. 6.

Turning to FIGS. 6-7, an example of the seeding performed at the seeding station is shown. As illustrated in these figures, the seeding station may include a reservoir 262 arranged to hold a seed mixture. In some embodiment, the seed mixture includes a viscous fluid with seeds evenly mixed into it. In some embodiments, the viscous fluid assists in suspending the seeds in a certain position on the growing surface. For example, the viscous fluids may create a matrix with the seeds being maintained in suspension on the growing surface. In some embodiments, the fluid mixture includes a gel, which may include a mixture of pectin, corn starch, glycerin, konjac, xanthum gum, guar gum, and/or combinations thereof. As will be appreciated, other food safe gels may be used in other embodiments. In some embodiments, as shown in FIG. 6, the seeds may be positioned on the growing surface in an array. For example, the seeds may be arranged in columns and rows on the growing surface. In some embodiments, the seeds may be applied to the growing surface in a density of between about 5-1000 seeds per square foot. As will be appreciated, the density of seeding may be determined based on the crops that are being grown in the farm. For example, the seed spacing, and the number of seeds placed on the growing surface, may vary from crop to crop.

Figure 8:
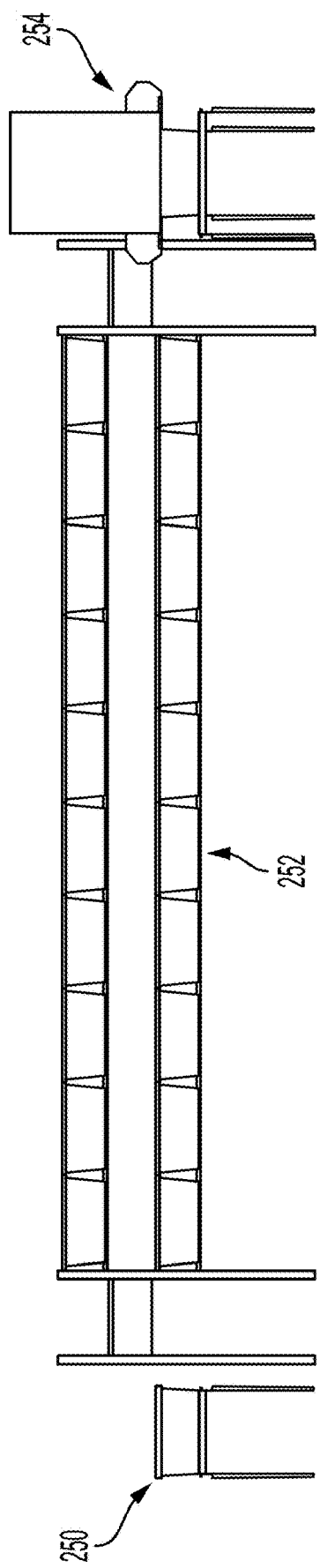
FIG. 8 is front view of the farm of FIG. 4.
Figure 9:
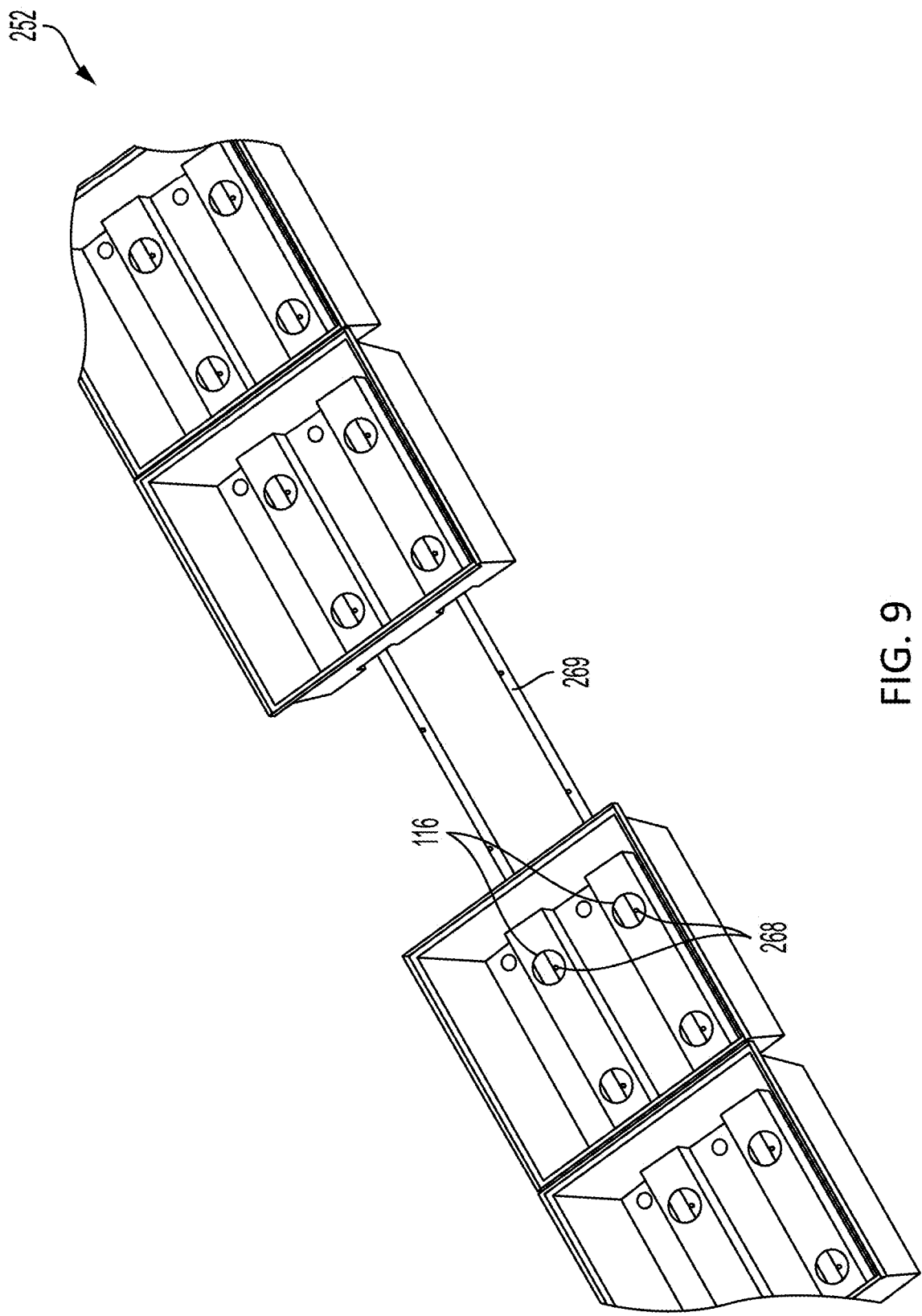
FIG. 9 is an enlarged view of a portion of an irrigation and growing station of a farm, with a container shown removed from a conveyor, according to one illustrative embodiment.

As shown in FIGS. 6 and 7 seeds may be transferred from the reservoir to the growing surface 206 via a pump 264 and a manifold 266. In some embodiments, as shown in FIG. 6 the manifold may have more than one outlet channel for depositing the seeds onto or at least partially into the growing surface. As will be appreciated, other devices may be used to deposit the seeds on to the growing surface in other embodiments. FIGS. 8 and 9 illustrates the irrigation and growing station of the farm according to some embodiments. As shown in this view, the station may have one or more nozzles 268 (see FIG. 9) arranged to provide aeroponic irrigation to the seeds. For example, the nozzle may be arranged to supply mist to the containers (e.g., to the aeroponic irrigation zone of the container). In an illustrative example, the nozzles may include a spray nozzle, such as an atomizer.

In some embodiments, as shown in FIG. 9, the nozzles 268 may be positioned below each container on the conveyor 269. For example, in some embodiment, a nozzle is positionable below each of the aeroponic irrigation openings 116 formed on the bottom of the container to allow mist to be directed into the container. As will be appreciated, nozzles also may be positioned under only a subset of the openings formed on the bottom of the container. In still other embodiments, the nozzles may be positioned along one or both sides of the container. In some embodiments, the nozzles may form part of the conveyor 269.

In some embodiments, each of the nozzles may be connected to a water supply line), such as water pipes, that are connected to a water supply. For example, the water supply line may be connected to a reservoir or to a water main. In embodiments in which the nozzles form part of the conveyor, the conveyor may itself serve as the water supply line.

As will be appreciated, the watering time and the watering amount may depend on the crops being grown in the farm. For example, in some embodiments, the nozzles may be arranged to spray the crops between 5 second and 2 minutes each cycle. Spraying may occur every 5 minutes, 10 minutes, 30 minutes, hour, or even longer.

Figure 10:
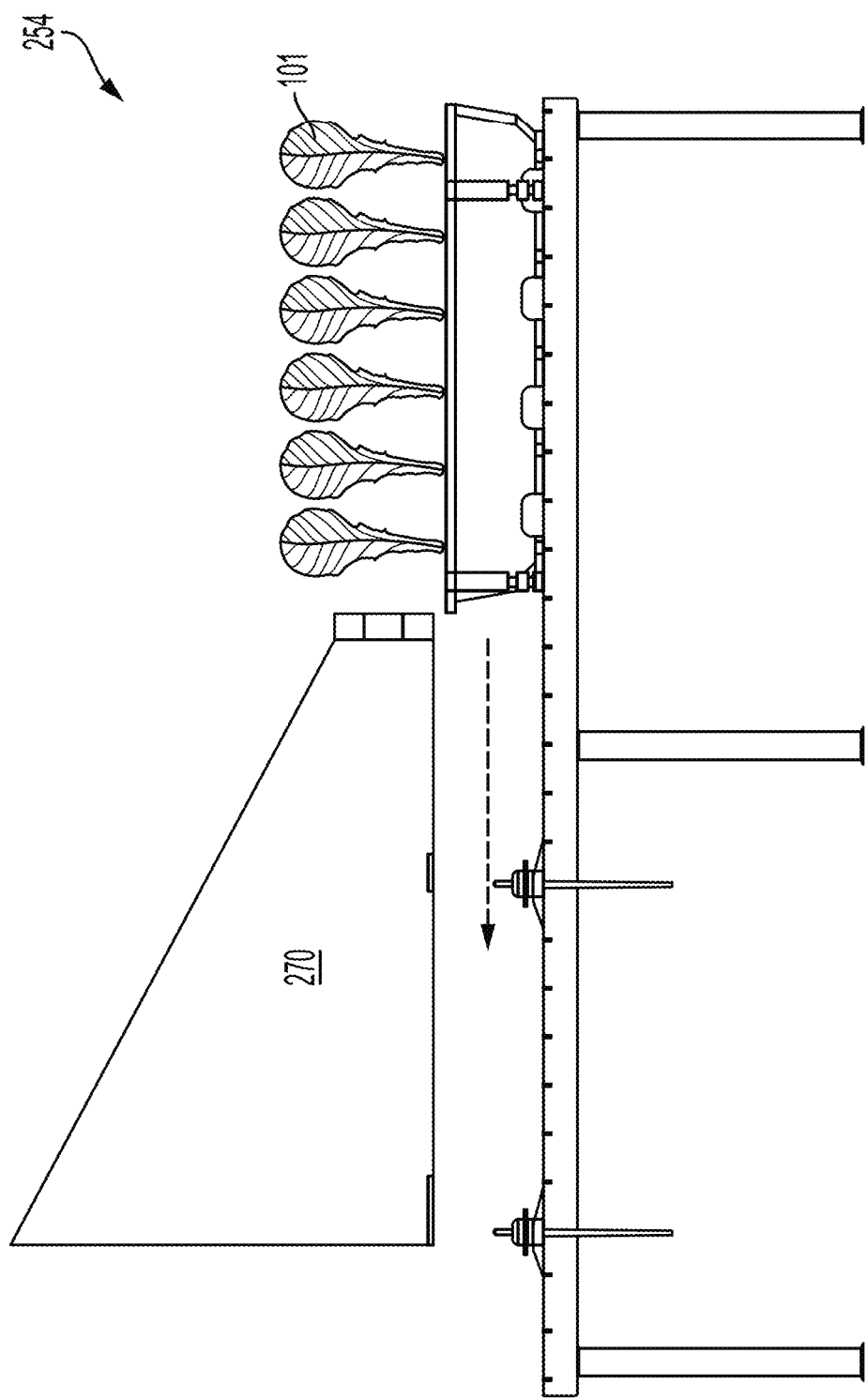
FIG. 10 is a harvesting and packing station of according to some embodiments.

FIG. 10 illustrates the harvesting and packing station to which the crops are transferred (e.g., from the irrigation and growing station) after the crops are fully grown. In some embodiments, as described, one or more containers are movable to the harvesting and packing station when new containers are added to the farm. In some embodiments, at the harvesting station, the crops may be removed from the container. In some embodiments, removal of crops from the containers may be done by the operator. In other embodiments, harvesting of the crops may be automated. For example, in some embodiments, as shown in FIG. 10, the container may be moveable below a harvester 270 (see the arrow), which is arranged to remove the crops from the container. For example, the harvester may include a blade arranged to cut the crops 101 off the growing surface.

After harvesting, the crops may be placed into one or more packing boxes (e.g., clamshell boxes). As will be appreciated, the crops also may be placed in bags, depending upon the type of crop being harvested. In some embodiments, during the packaging process, the crops may be labeled with a label having an identification (e.g., a QR code, as will be discussed) that corresponds to the growing container from which the crops were removed. For example, the label may include the batch information of the container and/or seeds used to grow the crops, as will be described.

After harvesting and packing is complete, the growing surface may be removed from the container and disposed of. The container may then be cleaned and sanitized for use in another growing cycle. As will be appreciated, the growing surface also may be reusable and cleaned and sanitized after harvesting.

Figure 11:
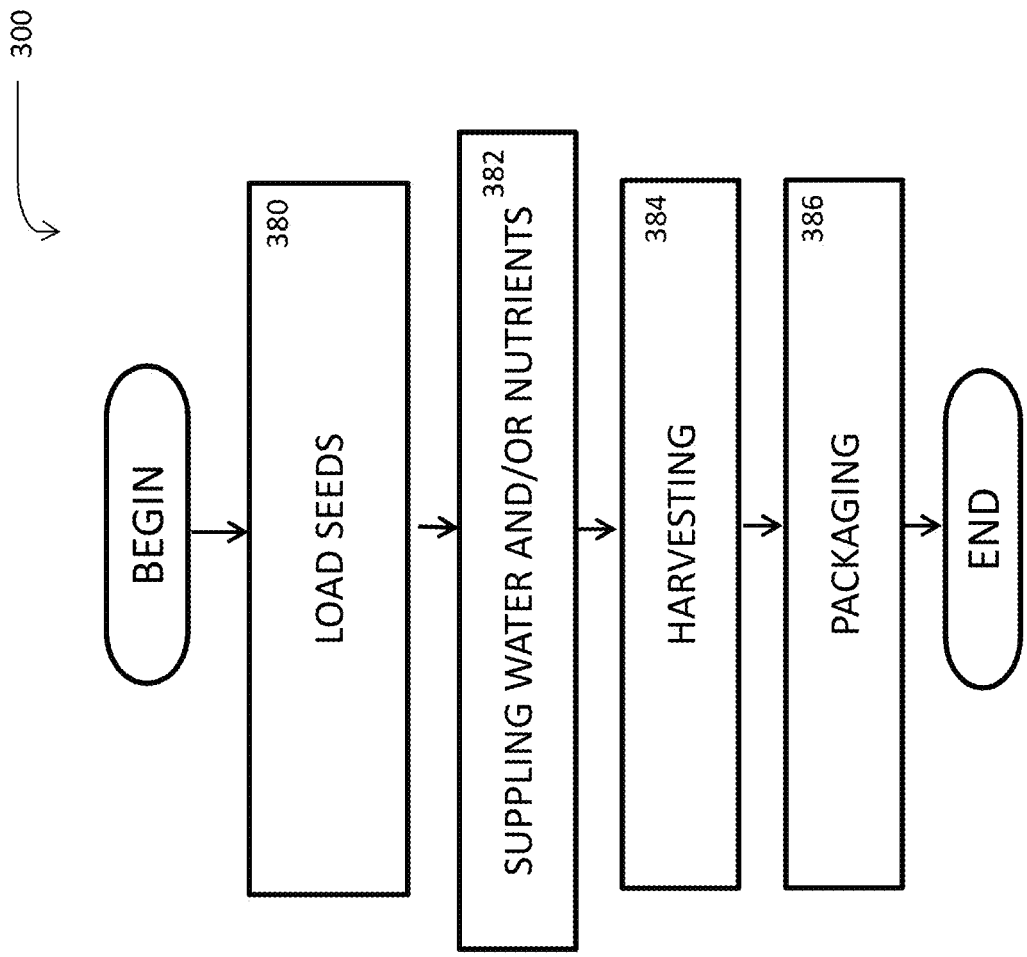
FIG. 11 illustrates a method of growing crops according to the farm according to one embodiment of the present disclosure.

FIG. 11 illustrates a method 300 of using the farm according to some embodiments. In some embodiments, the method includes moving a container to the seeding station and loading seeds onto or at least partially into the growing surface of the container 380. Next, the containers are moveable to the irrigation and growing station where water and/or nutrients are supplied to the seeds to grow the crops. In some embodiments, water and/or nutrients may be provided to one or more hydroponic irrigation zones in the container 382. For example, water and/or nutrients may be disposed in channels 120 (see FIG. 1) formed in the bottom of the container. As will be appreciated, the roots may not reach the hydroponic irrigation zone at the beginning of the growing phase. Instead, the during growth, the roots may extend into the container, where they may become at least partially disposed in the channel for hydroponic irrigation.

In some embodiments, water and/or nutrients also may be provided to the aeroponic irrigation zone of the container via one or more nozzles positioned at or near the container, such as below the aeroponic openings formed in the bottom of the container. In some embodiments, irrigating and growing includes periodically draining the water and/or nutrients via draining openings formed in the bottom of the container and, if necessary, providing additional water and/or nutrients to the hydroponic irrigation zones of the container.

As described above, additional containers may be periodically added to the farm, which may move one of the above-described containers down the conveyor and further in the irrigation and growing station until growing is complete. After a prescribed period of time has elapsed, one or more containers may be moved to the harvesting and packing station. As will be appreciated, in some embodiments, moving a container to the harvesting and packaging station includes moving a container with a fully grown crop to the harvesting and packaging container. In embodiments in which the farm is used to create seedlings, moving the container to the harvesting and packaging system may include moving a container with only seedlings to the harvesting station.

Next, the method may include harvesting the crops from the container 384. For example, the crops may be removed from the container and off the growing surface. In some embodiments, once the crops are removed, the container can be cleaned and sterilized for future use. The container also may be disposed of after use. Finally, the crops may be packaged 386 for transport and sale, by placing the crops into one or more shipping boxes. In some embodiments, during packaging, the package may be labeled with a label identifying the container in which the crop(s) was grown.

According to some embodiments, the farm may be arranged to track and trace the crops being packaged in each package. For example, the crops in each package may be traceable back to the seed loaded onto and/or at least partially in the growing surface of the container and/or to the container used to grow the crops.

In some embodiments, the farm may be arranged to track the container as it progresses within the farm during crop growth. For example, in some embodiments, each container may be labeled with a QR code or with another indicia (e.g., an RFID tag) such that the container is uniquely identifiable. When the container reaches the seeding station the seeding station may read the indicia using a reader. For example, the seeding station may scan the QR code on the container. The container may then be assigned a batch number, which may be used for tracking purposes. For example, the assigned batch number may correspond to a particular type of seed being applied onto and/or at least partially into the growing surface of the specific container on a certain day. The batch number also may correspond to the dates and times that the container moved through the irrigation and growing station and thereafter harvested and packaged at the packing station.

In some embodiments, the irrigation and growing station may include a reader for reading the container. In some embodiments, the reader at the irrigation and growing station may include a QR scanner or other suitable scanner for reading the indicia on the container. The irrigation and growing station also may include a camera arranged to take pictures of the containers as the container is moved through the station. In such embodiments, the pictures may be saved for monitoring progress of crop growth.

Finally, when the container reaches the harvesting and packaging station, the container may again be read by a reader. For example, a QR scanner at the harvesting station may be used to scan the QR code on the container. A label may then be printed and applied to the packaging box for the harvested crops. In some embodiments, the step of printing and adhering the label may be performed by an operator, although it also may be automated.

In some embodiments, the label adhered to each package may include a code (e.g., a QR code) or other indicia with that corresponds to the container and batch of the crops in the farm. In this regard, using this label, the crops may be traceable to the growing container and/or the seeds applied onto or at least partially into the growing surface. As such, in instances of a recall, only the specific packages corresponding to the recalled crops may be discarded, with the remainder of the harvested and packaged crops being available for sale.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A farm for growing one or more crops, the farm comprising:
    a container, the container comprising a growing surface, a lip, a bottom surface having one or more ridges with one or more openings and one or more plugs corresponding to the one or more openings, wherein the growing surface is substantially flat and attached to the lip of the container:
    a seeding station arranged to load a plurality of seeds onto or at least partially into the growing surface of the container, the seeding station comprising: a viscous fluid configured to hold the plurality of seeds in a desired position on or at least partially in the growing surface of the container, wherein the plurality of seeds are configured to be suspended in the viscous fluid, the viscous fluid comprising a gel comprising at least one of pectin, corn starch, glycerin, konjac, xanthum gum, and guar gum;
    a manifold separate from and not connected to the container comprising one or more outlet channels configured to dispense the plurality of seeds on or at least partially in the growing surface of the container, wherein the one or more outlet channels are positioned to maintain a predetermined density and a predetermined dispersion of the plurality of seeds while the plurality of seeds are dispensed on or at least partially in the growing surface of the container;
    an irrigation and growing station comprising one or more nozzles separate from and not connected to the container arranged to supply water and/or nutrients to the container for hydroponic aeroponic irrigation in the form of a mist of the one or more crops, wherein the irrigation and growing station is stationary;
    a harvesting and packaging station comprising a serrated, band saw, height adjustable blade arranged to harvest the crops from the container while keeping the container, the growing surface and roots of one or more plants intact to allow the one or more plants to continue to grow for a plurality of harvests, and to place the crops in one or more packages; and
    a conveyor, wherein the irrigation and growing station is arranged with the conveyor such that the container is configured to be conveyed above the one or more nozzles, wherein the conveyor is configured to move the container within and in between at least one of the seeding station, the irrigation and growing station, and the harvesting and packaging station.

2. The farm of claim 1, further comprising a conveyor arranged to move the container within and in between at least one of the seeding station, the irrigation and growing station, and the harvesting and packaging station.

3. The farm of claim 1, wherein the irrigation and growing station is arranged to provide hydroponic aeroponic irrigation via the one or more nozzles separate from and not connected to the container positioned at or near the container wherein the one or more openings on the one or more ridges of the bottom surface of the container are large enough to accommodate a size of the one or more nozzles and small enough to prevent roots of the crop from protruding from the container and being damaged during movement of the container on the conveyor.

4. The farm of claim 3, wherein the one or more nozzles are positioned below the one or more opening of the one or more ridges of the bottom surface of the container and/or to the side of one or more openings formed in one or more side walls of the container.

5. The farm of claim 4, wherein the one or more nozzles are connected to a water supply.

6. The farm of claim 1, wherein the irrigation and growing station includes one or more tiers for storing the container.

7. The farm of claim 1, wherein the harvesting station includes a harvester arranged to remove the one or more crops from the growing surface wherein the growing surface is attached to a top of the container, the growing surface having a first side and a second side opposite to the first side, the first side arranged to receive one or more seeds and the second side arranged to receive the mist of the aeroponic irrigation.

8. The farm of claim 7, wherein the growing surface comprises a material secured to the top of the container, the material comprising a fabric comprising one or more of bamboo fiber, felt, burlap, biostrate, Rockwoll, and coco coir.

9. The farm of claim 8, further comprising a positive displacement pump wherein the manifold is operably connected to the positive displacement pump.

\* \* \* \* \*